United States Patent
Li et al.

(10) Patent No.: US 7,586,216 B2
(45) Date of Patent: Sep. 8, 2009

(54) REDUNDANT ELECTRICAL BRAKE AND PROTECTION SYSTEM FOR ELECTRIC GENERATORS

(75) Inventors: Lei Li, Shanghai (CN); Zhigang Lu, Shanghai (CN); Ralph Teichmann, Albany, NY (US); Changyong Wang, Shanghai (CN); Wenqiang Yang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 308 days.

(21) Appl. No.: 11/421,912

(22) Filed: Jun. 2, 2006

(65) Prior Publication Data

US 2007/0279815 A1 Dec. 6, 2007

(51) Int. Cl.
*H02P 13/00* (2006.01)

(52) U.S. Cl. .......................... 307/151; 307/31; 307/38; 307/153; 388/920

(58) Field of Classification Search .................. 307/31, 307/38, 151, 153; 388/920
See application file for complete search history.

(56) References Cited

U.S. PATENT DOCUMENTS

| 5,127,085 | A * | 6/1992 | Becker et al. ............... 318/434 |
| 5,225,712 | A * | 7/1993 | Erdman ....................... 290/44 |
| 5,465,202 | A * | 11/1995 | Ibori et al. .................... 363/37 |
| 6,812,586 | B2 * | 11/2004 | Wacknov et al. ............. 290/52 |
| 7,239,036 | B2 * | 7/2007 | D'Atre et al. ................. 290/44 |
| 7,378,808 | B2 * | 5/2008 | Kuras et al. ................ 307/10.1 |
| 7,394,166 | B2 * | 7/2008 | Teichmann et al. ........... 290/44 |
| 2007/0177314 | A1 * | 8/2007 | Weng et al. .................. 361/20 |
| 2007/0273155 | A1 * | 11/2007 | Barton et al. ................. 290/44 |

* cited by examiner

*Primary Examiner*—Stephen W Jackson
*Assistant Examiner*—Adi Amrany
(74) *Attorney, Agent, or Firm*—Ann M. Agosti

(57) ABSTRACT

An apparatus for electric braking and system protection for an electric generator includes a dynamic brake and a crowbar circuit designed for cooperation with power converters to dump power upon command. The dynamic brake includes at least one resistor and the crowbar circuit includes another at least one resistor for dissipating power from the electric generator. Methods for use of the electric braking and system protection calls for shunting the power to at least one of the dynamic brake, the crowbar circuit and the generator side power converter.

17 Claims, 2 Drawing Sheets

REDUNDANT ELECTRICAL BRAKE AND PROTECTION SYSTEM FOR ELECTRIC GENERATORS

BACKGROUND OF THE INVENTION

The teachings herein relate generally to techniques for safe and controllable de-energizing of an electrical generator. In this context, de-energizing of an electrical generator pertains to countering the motive forces on the generator shaft, the reduction of rotational energy stored in the rotational mass of the generator, and the reduction of electromagnetic field energy stored in the generator.

In embodiments where control over the motive force is limited or not possible, methods for de-energization of the generator in a controlled manner must be provided. One example includes generators driven by a wind turbine. For example, in instances where high winds prevail, stopping the wind turbine could exert unreasonable or excessive forces upon the components of the wind turbine.

Some attempts to provide for effective de-energization have employed mechanical brakes. However, mechanical brakes can be large, expensive and wear quickly if the braking event occurs often. Such systems require periodic maintenance and testing to ensure reliability, and this causes at least some loss in production. Typically, the mechanical brake has a relatively long response time (tens of seconds). Under some severe conditions, the long response time can result in overspeed of the electric generator. Controlling the de-energization process using mechanical brakes is difficult. Further, such systems must be fail-safe and meet high reliability standards.

In installations with limited or no control over the motive force, the speed of the electric generator has typically been reduced by a combination of a crowbar circuit and a mechanical brake or a dynamic brake in a dc-link of a power converter.

What is needed is a redundant, controllable and cost-effective braking system for an electric generator. Preferably, the braking system provides for de-energizing of the electrical generator in a rapid, safe and reliable fashion.

BRIEF SUMMARY OF THE INVENTION

The above discussed and other drawbacks and deficiencies are overcome or alleviated by the teachings disclosed herein.

Disclosed is an electric power converter that includes: a control unit; a generator-side converter; a grid-side converter; a common direct current (DC) bus coupling the generator-side converter and the grid-side converter; a dynamic brake coupled to the DC bus and configured for receiving a braking signal from the control unit; and a crowbar circuit coupled to the generator-side converter and configured for receiving another braking signal from the control unit.

Also disclosed is a method for de-energizing an electric generator, that calls for: providing an electric power converter comprising a control unit; a generator-side converter; a grid-side converter; a common direct current (DC) bus coupling the generator-side converter and the grid-side converter; a dynamic brake coupled to the DC bus and configured for receiving a braking signal from the control unit; and a crowbar circuit coupled to the generator-side converter and configured for receiving another braking signal from the control unit; issuing from the control unit at least one of the braking signal and the another braking signal to dissipate energy from the electric generator; and, dissipating the energy using at least one of the dynamic brake and the crowbar circuit.

Further disclosed is a computer program product stored on machine readable media, the product having instructions for de-energizing an electric generator, the electric generator comprising an electric power converter having a control unit; a generator-side converter; a grid-side converter; a common direct current (DC) bus coupling the generator-side converter and the grid-side converter; a dynamic brake coupled to the DC bus and configured for receiving a braking signal from the control unit; and a crowbar circuit coupled to the generator-side converter and configured for receiving another braking signal from the control unit, the instructions comprising instructions for: issuing from the control unit at least one of the braking signal and the another braking signal to dissipate energy from the electric generator; and, dissipating the energy using at least one of the dynamic brake and the crowbar circuit.

The features and advantages of the present invention will be appreciated and understood by those skilled in the art from the following detailed description and drawings.

BRIEF DESCRIPTION OF THE DRAWINGS

Referring now to the drawings wherein like elements are numbered alike in the several figures, wherein.

DETAILED DESCRIPTION THE INVENTION

The teachings herein provide for a redundant protection system having a dynamic brake and a crowbar circuit for effective de-energizing of an electric generator.

As used herein, the terms "disturbance," "grid disturbance," "fault," "system fault," "transient" and other similar terminology generally refers to any event causing perturbations in a signal of an electric grid to which the electric generator is electrically connected. Examples of events that may cause a disturbance in the grid signal (e.g., a fault on an electric grid) are well known and not discussed further herein. Inevitably, as a variety of generating facilities contribute to the grid signal and as a variety of phenomena including transient events may occur, the components of the grid signal may degrade or vary to some extent. A tolerance for signal perturbation is typically selected by the system operator when opting for automatic response of the electrical brake and protection system.

As discussed herein, the electric generator produces a three-phase electric signal. However, it should be recognized that discussion of a three-phase signal is for convenience and illustration purposes only, and not limiting of the teachings herein. For example, the teachings herein may be applied to single phase, two phase and other multi-phase or poly-phase signals.

One skilled in the art will recognize with regard to the teachings herein that reference to a wind turbine is merely illustrative and non-limiting. For example, other motive force for the electric generator could include a hydropower turbine, a gas turbine, as well as other similar equipment. Therefore, it should be recognized that some aspects of the exemplary embodiment have counterparts in other embodiments that share similar, but not identical, nomenclature.

Figure 1:
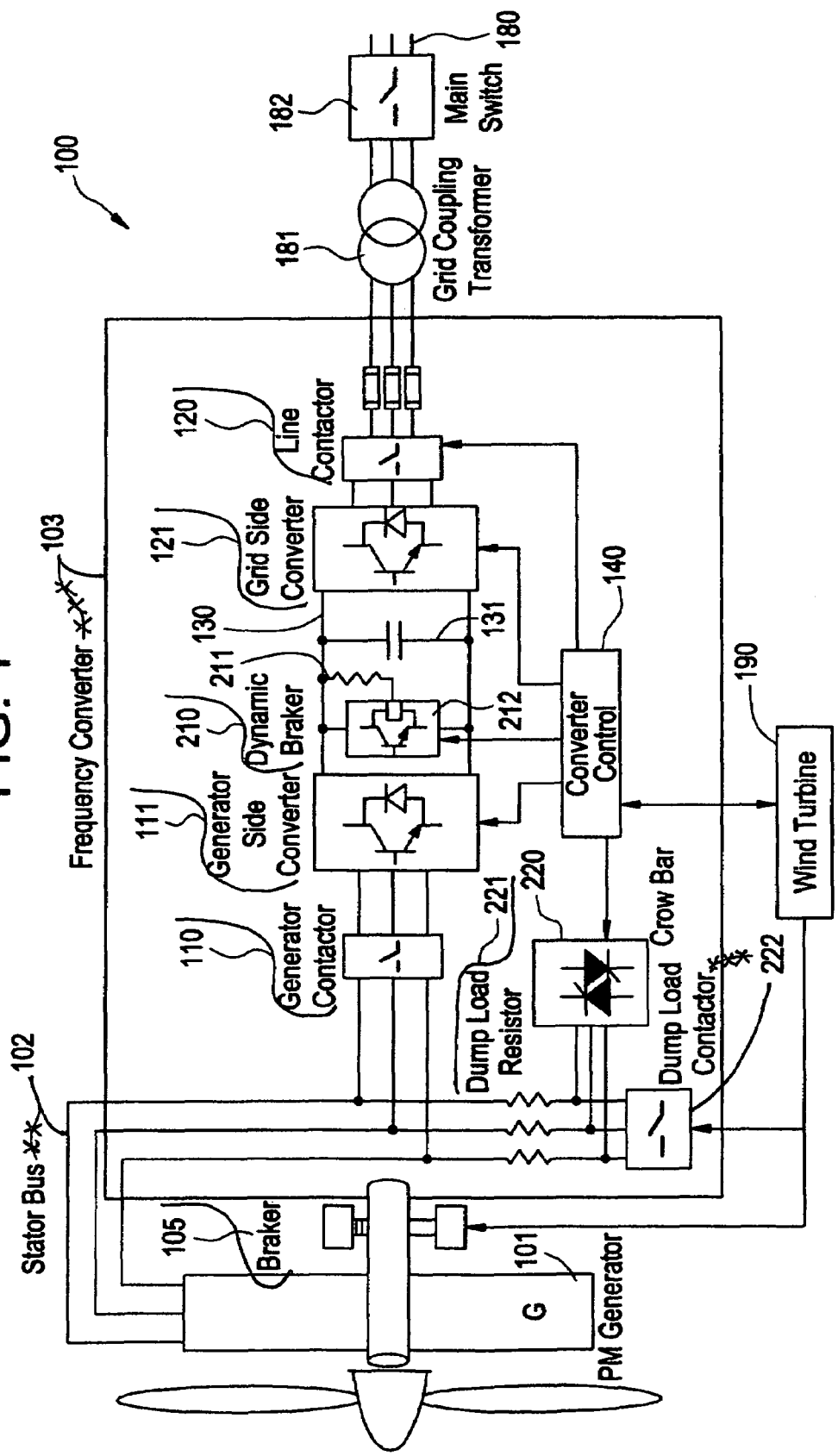
FIG. 1 depicts aspects of an electric generator employing a dynamic brake and crowbar circuit as a redundant protection system.

Referring now to FIG. 1, exemplary aspects of a wind turbine 100 are shown. In the illustration of FIG. 1, the wind turbine 100 includes a generator 101 coupled to a stator bus 102. The stator bus 102 is coupled to a frequency converter 103 that provides a coupling to an electric grid 180. Coupling to the electric grid 180 typically involves use of a grid coupling transformer 181 and a main switch 182. In this illustration, the generator 101 includes a braker unit 105 for braking of the generator 101.

The frequency converter 103 (also referred to as an "electric power converter") includes various components for producing an electric signal that is synchronized with the electric grid 180. Non-limiting examples of components associated with the frequency converter 103 include a generator contactor 110 that is coupled to the stator bus 102 and a generator side converter 111. The generator side converter 111 receives an alternating current (AC) input signal from the generator 101 and provides for conversion of the electrical input to a direct current (DC) signal. The generator side converter 111 provides the DC signal to a grid side converter 121 through a DC bus 130. The grid side converter 121 converts the DC signal to an AC output signal that is suited for feeding the electric grid 180. Feeding the electric grid 180 occurs through a line contactor 120. Operation of at least some of the various components in the frequency converter 103 is governed by a converter control unit 140.

Also included in the wind turbine 100 are a dynamic brake 210 and a crowbar circuit 220. A dump load resistor 221 is engaged by at least one of the crowbar circuit 220 and a dump load contactor 222. Both the dynamic brake 210 and the crowbar circuit 220 are coupled to the converter control unit 140 for controlling the operation thereof. In this illustration, the at least one dump load resistor 221 and the generator contactor 110 are coupled in parallel to the stator bus 102. Coupling of the crowbar circuit 220 and the dump load contactor 222 to the stator bus 102 are also in parallel, and in series after the dump load resistor 221.

Operation of the wind turbine 100, as depicted in this illustration, is governed by a wind turbine control unit 190. In this illustration, the wind turbine control unit 190 is coupled to the braker unit 105, the dump load contactor 222 and the converter control unit 140. Typically, the wind turbine control unit 190 issues at least one braking signal to the converter control unit 140, the dump load contactor 222 and the mechanical braker 105. The converter control unit 140 issues the braking power dispatching signals to dynamic brake 210 and crowbar circuit 220.

The various contactors of the wind turbine 100 perform switching functions as are known in the art.

As used herein, the combination of the dynamic brake 210 and the crowbar circuit 220, working with the mechanical braker 105 and the dump load contactor 222, provide a redundant protection system for the wind turbine 100.

As a first approach for design of the redundant protection system, the dynamic brake 210 is used to prevent the DC bus 130 from over voltage, and thus protect the generator side converter 111 and the grid side converter 121. By use of the dynamic brake 210 in this fashion, infrequent activation of the crowbar circuit 220 is needed. Thus, controllability of the generator side converter 111 during a grid disturbance is improved.

In a second approach for design of the redundant protection system, the dynamic brake 210 includes a sufficiently large power rating such that the crowbar circuit 220 can be eliminated or modified. This second approach, however, will usually call for costly and bully designs of the dynamic brake 210.

One skilled in the art will recognize that design issues for the redundant protection system can be addressed at least by balancing aspects of the teachings herein. Accordingly, design for the redundant protection system of the wind turbine 100 can be tailored to reducing the capacity of the dynamic brake 210 while limiting activation of the crowbar circuit 220. Other aspects may be considered as well. For example, the dynamic brake 210 may incorporate design features that when used in conjunction with the design features of the crowbar circuit 220, a most rapid de-energization is achieved. Accordingly, it can be said that the redundant protection system typically includes a "balanced design."

With further regard to the dynamic brake 210, the dynamic brake 210 typically includes a dynamic brake resistor 211 having, for example, a rating equivalent to the rating of the generator 101, as well as a brake chopper 212. The brake chopper 212 is usually intermediate to the generator side converter 111 and the grid side converter 121, and typically in parallel to at least one DC capacitor 131. In this illustration, the dynamic brake 210 and the at least one DC capacitor 131 are coupled to the DC bus 130.

With further regard to the crowbar circuit 220, the dump load contactor 222 receives commands from the converter control unit 140. The dump load resistor 221 may be engaged by at least one of actuation of the crowbar circuit 220 and actuation of the dump load contactor 222. Typically, the dump load resistor 221 is rated similarly to the rating for the generator 101, however, this is merely illustrative and non-limiting. In some embodiments, the dump load resistor 221 includes a plurality of resistor banks. In these embodiments, engaging the dump load resistor 221 might call for engaging protection features in a step-by-step process involving sequential activation of the crowbar circuit 220 and the dump load contactor 222.

In typical operation, the redundant protection system can provide for a total braking power that equals the sum of the dump load resistor 221 and the dynamic brake 210, by use of the generator side converter 111. When the wind turbine 100 is not electrically coupled to the grid 180, the excess power transferred through the generator side converter 111 is dissipated in the dynamic brake resistor 211. If the braking power is less than the rating of the dynamic brake 210, then only the generator side converter 111 is engaged and the power is transferred to the dynamic brake 210. If the power is in excess of the rating of the dynamic brake 210, the at least one dump load resistor 221 is engaged. In the exemplary embodiment, engagement of at least one braking resistor occurs between about 0.8 and 1 per unit of the rating of the dynamic brake 210.

In another embodiment, providing the crowbar circuit 220 at AC terminals for the generator side converter 111 and the dynamic brake 210 at DC side terminals for the generator side converter 111 provides for a high level of control over power dissipation. Control of both the crowbar circuit 220 and the dynamic brake 210 provides capabilities for stopping the generator 101 while following a desired torque-speed curve.

The teachings herein provide other advantages. For example, redundancy ensures availability of a protection system (for example, if one of the generator side converter 111 and the grid side converter 121 fails, the dump load resistor 221 can provide for effective braking and damping of any turbine overspeed). As the torque required for braking can be effectively managed, mechanical stress within the wind turbine 100 can be mitigated. Applying the redundant protection system reduces braking time, which is short in comparison with other techniques for braking.

While some prior art techniques have called for designing converters with a power rating that provides for accommodation of braking, this is not required. That is, with the redundant protection system, the power rating for each of the converters is independent of a requirement for braking torque. Accordingly, added power margin is not required for each of the converters, and therefore each of the converters need not be oversized. Even if the generator side converter 111 and crowbar circuit 220 were to fail, the generator contactor 110 could be engaged to dissipate power in the dump load resistor 221. In this instance, the converter control unit 140 would also provide coordination with the braker unit 105 to stop the generator 101. These exemplary benefits, as well as others, provide for cost benefits as well as installation flexibility.

In short, the redundant protection system includes a system wherein two energy dissipation paths are consolidated. One path includes the generator side converter 111; the other path includes the dump load resistor 221. The generator side converter 11 can also be designed to accommodate up to rated output power rating for the generator 101, while the dump load resistor 221 is sized to provide the additional needed braking power (for example, if the maximum braking power required is twice the rating for the grid side converter 121, the dump load resistor 221 is sized accordingly to make up the difference between the rating for the generator side converter 111 and the required braking power).

Figure 2:
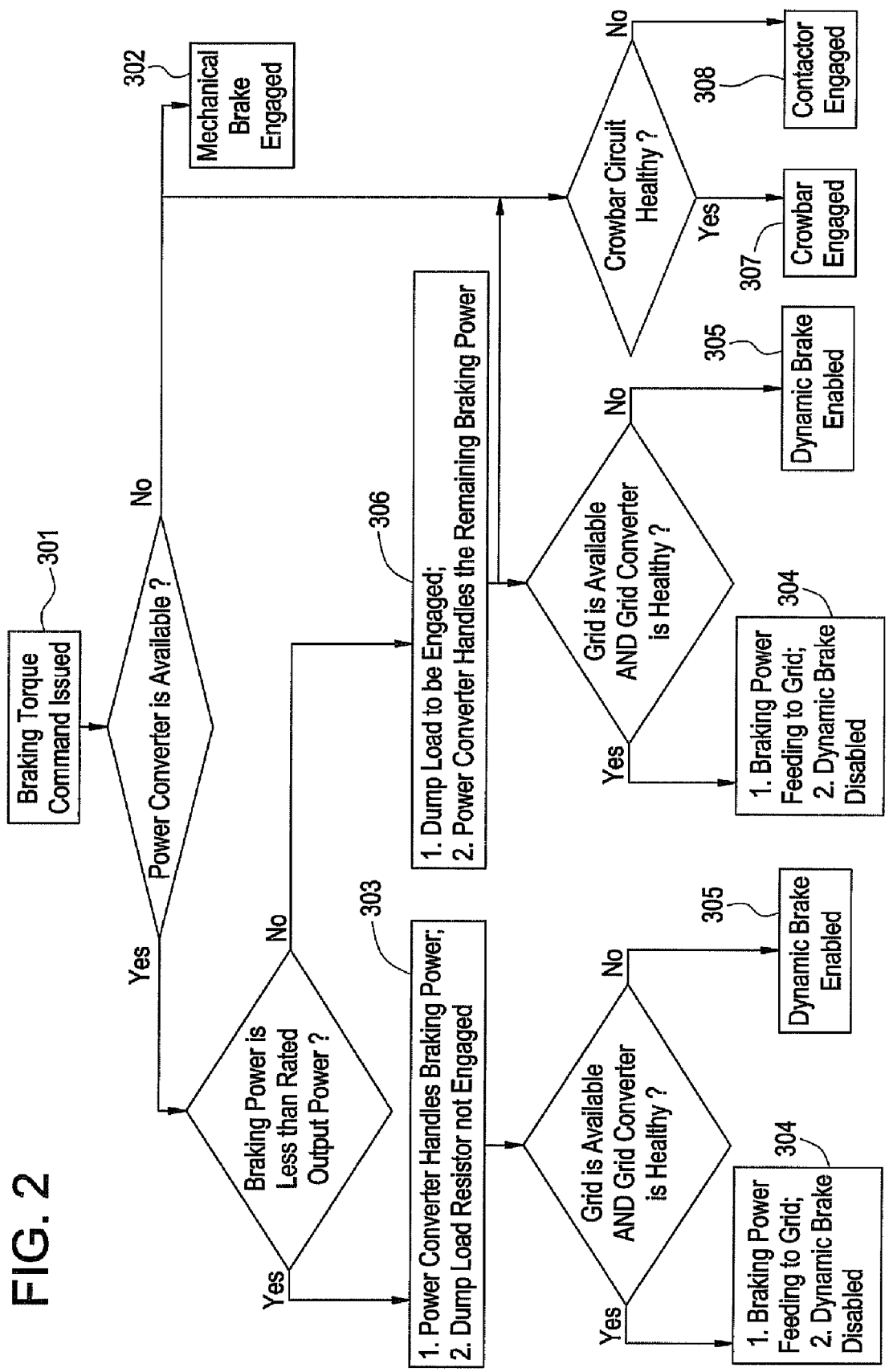
FIG. 2 is a flow chart depicting exemplary logic for using the redundant protection system.

Referring now to FIG. 2, exemplary logic for braking the generator 101 is provided. Turbine braking 300 commences by issuing a braking command 301. The wind turbine control unit 190 makes a determination regarding availability of the generator side converter 111. If the generator side converter 111 is not available, then the wind turbine control unit 190 provides for engaging the braker unit 302. If the generator side converter 111 is available, a determination is made by the converter control 140 regarding the required amount of braking power. If the required braking power is less that the rated output power of the generator 101, then the converter control unit 140 provides for dissipating power in the generator side converter 303. If the grid 180 is available, and the grid side converter 121 is operating properly, then feeding braking power to the grid 304 occurs (while the dynamic brake 210 is disabled). If the grid 180 is not available, or the grid side converter 121 is not operating properly, then enabling of the dynamic brake 305 occurs.

In situations where the required braking power exceeds the output power, engaging of the dump load resistor 306 occurs. When engaging of the dump load resistor 306 occurs, the generator side converter 111 usually dissipates the remaining braking power. If engaging of the dump load resistor 306 occurs, a determination is also made regarding availability of the grid 180. If the grid 180 is available, and the grid side converter 121 is operating properly, then feeding braking power to the grid 304 occurs (while the dynamic brake 210 is disabled). If the grid 180 is not available, or the grid side converter 121 is not operating properly, then enabling of the dynamic brake 305 occurs.

In addition to determining if the grid 180 is available when engaging of the dump load resistor 306 occurs, a determination is made regarding availability of crowbar circuit 220. If the crowbar circuit 220 is available, then engaging of the crowbar circuit 307 occurs. If the crowbar circuit 220 is not available, then engaging of the dump load contactor 308 occurs.

Typically, issuing a braking command 301 involves one of an operator and the wind turbine control unit 190 calling for the braking and protecting of the electric generator 101. In one example, the command is manually issued to provide for disconnection of the electric generator 101 to provide for maintenance. However, in other embodiments, the command can be issued automatically by system monitoring equipment, such as the wind turbine control unit 190 or converter control unit 140 in response to a system fault.

Of course, the foregoing logic is merely exemplary, and therefore not an exhaustive description of sequences and events that may take place during operation of the redundant protection system. Although the exemplary wind turbine 100 discussed herein includes a generator 101 having a rated output of between about 100 kW and 5 MW, this is merely illustrative and non-limiting. That is, the teachings herein may be implemented without being limited by the power rating for the generator 101.

With regards for aspects of operation of the redundant protection system, when the required braking power is within the rated power for the generator side converter 111, the dump load resistor 221 is usually disabled, and the generator side converter 111 is used to accommodate the required braking power. This approach is typically followed as the generator side converter 111 can regulate the required braking power upon issuance of the braking command. When the required braking power exceeds the power rating for the generator side converter 111, both the dump load resistor 221 and the generator side converter 111 are used. Typically, the converter control unit 140 provides for regulation of the braking power.

When the grid 180 is available and the grid side converter 121 is also available, the generator side converter 111 will typically feed up to the 100 kW braking power to the grid 180 up to the rating of the generator side converter 111. Alternatively, when the grid 180 is not available or the grid side converter 121 is in a fault condition, the dynamic brake 210 will be activated and the braking power will be consumed in dynamic brake resistor 211. The fast response time (typically in micro-seconds) provides a high priority for engaging the crowbar circuit 220. The fast response time is typically realized due to the use of semiconductors like IGBT or thyristor, etc. If the crowbar circuit 220 is in a fault condition, the dump load contactor 222 is closed.

In another embodiment, if the generator side converter 111 is unavailable (for example, if the generator side converter 111 is in fault mode or communication between the generator side converter 111 and the turbine control unit 190 is in fault mode), the dump load resistor 221 is engaged through actuation of the dump load contactor 222 and the braker unit 105 is also activated. In this situation, the dump load resistor 221 would help to prevent over-speed due to fast response time in comparison to the mechanical braker unit 105. Further, the dump load resistor 221 would mitigate loading of the mechanical braker unit 105 and therefore increase the life of the braker unit 105.

Typically, the redundant protection system provides maximum braking power that is substantially larger than the rated output power of the generator 101 for normal operational conditions. For example, the redundant protection system provides maximum braking power that is twice or even more than the rated output of the generator 101.

Although the teachings herein have been set forth in terms of a wind turbine 100, one skilled in the art will recognize that the teachings herein are also applicable to other components as well. For example, the dynamic brake 210 and the crowbar circuit 220 may be used advantageously to protect various power generation devices and power consuming devices alike. Non-limiting examples of equipment wherein the teachings herein may be applied include: other types of generator converters, a variable speed pump; a fuel cell converter; a variable speed fan; and variable speed process control equipment.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric power converter comprising:
a converter control unit;
a generator-side converter coupled to a stator bus via a generator contactor;
a grid-side converter;
a common direct current (DC) bus coupling the generator-side converter and the grid-side converter;
a dynamic brake coupled to the DC bus, the dynamic brake including a chopper connected across the DC bus and a dynamic brake resistor connected between the chopper and the DC bus, the dynamic brake configured to dissipate excess electrical power in the dynamic brake resistor in response to receiving a braking power dispatch signal from the converter control unit; and
a crowbar circuit coupled to the generator contactor via the stator bus, the crowbar circuit configured to engage a dump load resistor coupled to the stator bus in response to receiving the braking power dispatch signal from the converter control unit, the dump load resistor being rated for about a full power rating of the generator-side converter.

2. The electric power converter as in claim 1, wherein a DC capacitor is coupled to the DC bus in parallel with the dynamic brake.

3. The converter as in claim 1, wherein the chopper is intermediate to the generator-side converter and the grid-side converter and in parallel to a DC capacitor coupled to the DC bus.

4. The electric power converter as in claim 1, wherein the dump load resistor functions to dissipate electrical power from the generator-side converter.

5. The electric power converter as in claim 1, wherein the crowbar circuit comprises a dump load contactor coupled to the stator bus for directing braking power.

6. The electric power converter as in claim 1, further comprising a mechanical braker unit configured for receiving a braking signal from a wind turbine control unit and applying a braking force to the electric generator.

7. The electric power converter as in claim 1, wherein the dynamic brake resistor is rated for about a full power rating of the generator-side converter.

8. The electric power converter as in claim 1, wherein the dynamic brake and the crowbar circuit form a redundant protection system for effective de-energizing of an electric generator.

9. The electric power converter as in claim 1, wherein an input signal to the generator-side converter comprises at least one of a single phase, two phase, three phase and multi-phase signal.

10. The electric power converter as in claim 1, wherein an output signal from the grid-side converter comprises at least one of a single phase, two phase, three phase and multi-phase signal.

11. A method for de-energizing an electric generator, comprising:
providing an electric power converter including a converter control unit; a generator-side converter coupled to a stator bus via a generator contactor; a grid-side converter; a common direct current (DC) bus coupling the generator-side converter and the grid-side converter; a dynamic brake coupled to the DC bus, the dynamic brake including a chopper connected across the DC bus and a dynamic brake resistor connecting the chopper to the DC bus, and configured for receiving a braking signal from the control unit; and a crowbar circuit coupled to the generator contactor via the stator bus, the crowbar circuit configured for engaging a dump load resistor coupled to the stator bus in response to receiving the braking signal;
issuing the braking signal; and,
dissipating energy from the electric generator using at least one of the dynamic brake and the dump load resistor, at least one of the dump load resistor and the dynamic brake resistor being rated for about a full power rating of the generator-side converter.

12. The method for de-energizing an electric generator as in claim 11, wherein the step of dissipating comprises disabling the dump load resistor when the required braking power is within the rated power for the generator-side converter.

13. The method for de-energizing an electric generator as in claim 11, wherein issuing comprises one of manually issuing and automatically issuing.

14. The method for de-energizing an electric generator as in claim 11, wherein the step of dissipating the energy comprises routing excess power to at least one of the dynamic brake and the dump load resistor.

15. The method for de-energizing an electric generator as in claim 14, wherein routing excess power to the crowbar circuit comprises a stepwise engaging of the crowbar circuit and a dump load contactor.

16. The method for de-energizing an electric generator as in claim 11, wherein the step of providing comprises forming the dynamic brake and the crowbar circuit into a redundant protection system for effective de-energizing of an electric generator.

17. A computer program product stored on machine readable media, the product comprising instructions for de-energizing an electric generator connected to an electric power converter having a control unit; a generator-side converter coupled to a stator bus via a generator contactor; a grid-side converter; a common direct current (DC) bus coupling the generator-side converter and the grid-side converter; a dynamic brake coupled across the DC bus, the dynamic brake having a dynamic brake resistor connecting a chopper in the dynamic brake to the DC bus; and a crowbar circuit coupled to the generator contactor via the stator bus, the instructions causing the electrical power converter to:
issue a braking signal from the control unit to at least one of the dynamic brake and the crowbar circuit, the braking signal functioning to cause the crowbar circuit to engage a dump load resistor coupled to the stator bus in response; and,
dissipate the energy using at least one of the dynamic brake resistor in the dynamic brake and a dump load resistor in the crowbar circuit.

* * * * *

UNITED STATES PATENT AND TRADEMARK OFFICE
CERTIFICATE OF CORRECTION

PATENT NO. : 7,586,216 B2  
APPLICATION NO. : 11/421912  
DATED : September 8, 2009  
INVENTOR(S) : Li et al.

Page 1 of 1

It is certified that error appears in the above-identified patent and that said Letters Patent is hereby corrected as shown below:

In Column 3, Line 63, delete "bully" and insert -- bulky --, therefor.

In Column 5, Line 15, delete "11" and insert -- 111 --, therefor.

In Column 7, Line 36, in Claim 3, insert -- electric power --, before "converter".

Signed and Sealed this

Twenty-second Day of December, 2009

David J. Kappos  
*Director of the United States Patent and Trademark Office*